(12) United States Patent
Lund et al.

(10) Patent No.: US 9,257,036 B2
(45) Date of Patent: Feb. 9, 2016

(54) LONG LIFESPAN WIRELESS SENSORS AND SENSOR NETWORK

(71) Applicant: University of Alaska Anchorage, Anchorage, AK (US)

(72) Inventors: John Lund, Anchorage, AK (US); Todd Petersen, Anchorage, AK (US)

(73) Assignee: University of Alaska Anchorage, Anchorage, AK (US)

( * ) Notice: Subject to any disclaimer, the term of this patent is extended or adjusted under 35 U.S.C. 154(b) by 284 days.

(21) Appl. No.: 13/891,894

(22) Filed: May 10, 2013

(65) Prior Publication Data

US 2013/0342355 A1    Dec. 26, 2013

Related U.S. Application Data

(60) Provisional application No. 61/645,356, filed on May 10, 2012.

(51) Int. Cl.
  *G08C 19/16* (2006.01)
  *G08C 17/02* (2006.01)
  *H04Q 9/00* (2006.01)

(52) U.S. Cl.
  CPC . *G08C 17/02* (2013.01); *H04Q 9/00* (2013.01)

(58) Field of Classification Search
  CPC ..... H04W 84/18; H04W 24/00; H04W 40/10; H04W 40/20; H04W 40/28; H04W 48/16; H04W 4/00; H04W 52/0225; H04W 52/322; H04W 8/005; Y02B 60/50; Y02B 20/40; Y02B 20/48; Y02B 60/42; Y02B 70/346; Y02B 90/243; Y02B 90/248; Y02T 10/70; Y02T 10/72; Y02T 10/92; H02J 1/00; H02J 7/0052; H02J 7/007; H02J 7/0021; H02J 7/025; H02J 7/345; H02J 7/00; H01G 9/0029; H01G 9/035; H01G 9/0425; H01G 9/06; H01G 9/10
  See application file for complete search history.

(56) References Cited

U.S. PATENT DOCUMENTS

| | | | |
|---|---|---|---|
| 2008/0049700 A1* | 2/2008 | Shah et al. | 370/342 |
| 2009/0126801 A1* | 5/2009 | Grill et al. | 137/78.3 |
| 2011/0261738 A1* | 10/2011 | Mukherjee | 370/311 |
| 2012/0173171 A1* | 7/2012 | Bajwa et al. | 702/56 |
| 2012/0187907 A1* | 7/2012 | Nysen | 320/116 |
| 2012/0268280 A1* | 10/2012 | Hatch et al. | 340/627 |
| 2015/0029914 A1* | 1/2015 | Elliott et al. | 370/311 |

* cited by examiner

*Primary Examiner* — Kerri McNally
*Assistant Examiner* — Renee Dorsey
(74) *Attorney, Agent, or Firm* — Ballard Spahr LLP

(57) ABSTRACT

Methods, systems, and apparatuses for managing sensor information are disclosed. An example apparatus can comprise a power unit configured to collect energy, a sensor unit configured to receive sensor data from a sensor, a memory unit configured to store the sensor data, a communication unit configured to wirelessly broadcast the sensor data to one or more sensor nodes in a network of sensor nodes, and a processing unit. The processing unit can be configured to operate at least one of the sensor unit, the memory unit, and the communication unit after the energy collected in the power unit reaches a threshold value.

20 Claims, 10 Drawing Sheets

LONG LIFESPAN WIRELESS SENSORS AND SENSOR NETWORK

CROSS REFERENCE TO RELATED PATENT APPLICATION

This application claims priority to U.S. Provisional Application No. 61/645,356 filed May 10, 2012, herein incorporated by reference in its entirety.

SUMMARY

It is to be understood that both the foregoing general description and the following detailed description are exemplary and explanatory only and are not restrictive of the subject disclosure. Provided are methods, systems, and apparatuses for sensor management. An example apparatus can comprise a power unit configured to collect energy, a sensor unit configured to receive sensor data from a sensor, a memory unit configured to store the sensor data, a communication unit configured to wirelessly broadcast the sensor data to one or more sensor nodes in a network of sensor nodes, and a processing unit. The processing unit can be configured to operate at least one of the sensor unit, the memory unit, and the communication unit after the energy collected in the power unit reaches a threshold value.

In one aspect, an exemplary method can comprise collecting energy in an energy storage unit. Sensor data can be received from a sensor. The sensor data can be stored in non-volatile memory. The sensor data can be broadcast for detection by a sensor node in a network of sensor nodes. Additional sensor data can be received from the sensor node.

In another aspect, an exemplary method can comprise providing a geographically distributed network of sensor nodes. At least one of the sensor nodes can comprise a wireless transceiver, a power unit configured to collect energy, and a sensor. Energy can be collected at the sensor nodes. Sensor data can be detected at the sensor nodes. The sensor data can be communicated among at least a portion of the sensor nodes. The sensor data can be received from at least one of the sensor nodes.

Additional aspects, features, or advantages of the subject disclosure will be set forth in part in the description which follows, and in part will be obvious from the description, or may be learned by practice of the subject disclosure. The advantages of the subject disclosure will be realized and attained by means of the elements and combinations particularly pointed out in the appended claims.

BRIEF DESCRIPTION OF THE DRAWINGS

The accompanying drawings are incorporated and illustrate exemplary embodiment(s) of the subject disclosure and together with the description and claims appended hereto serve to explain various principles, features, or aspects of the subject disclosure:

DETAILED DESCRIPTION

Figure 1:
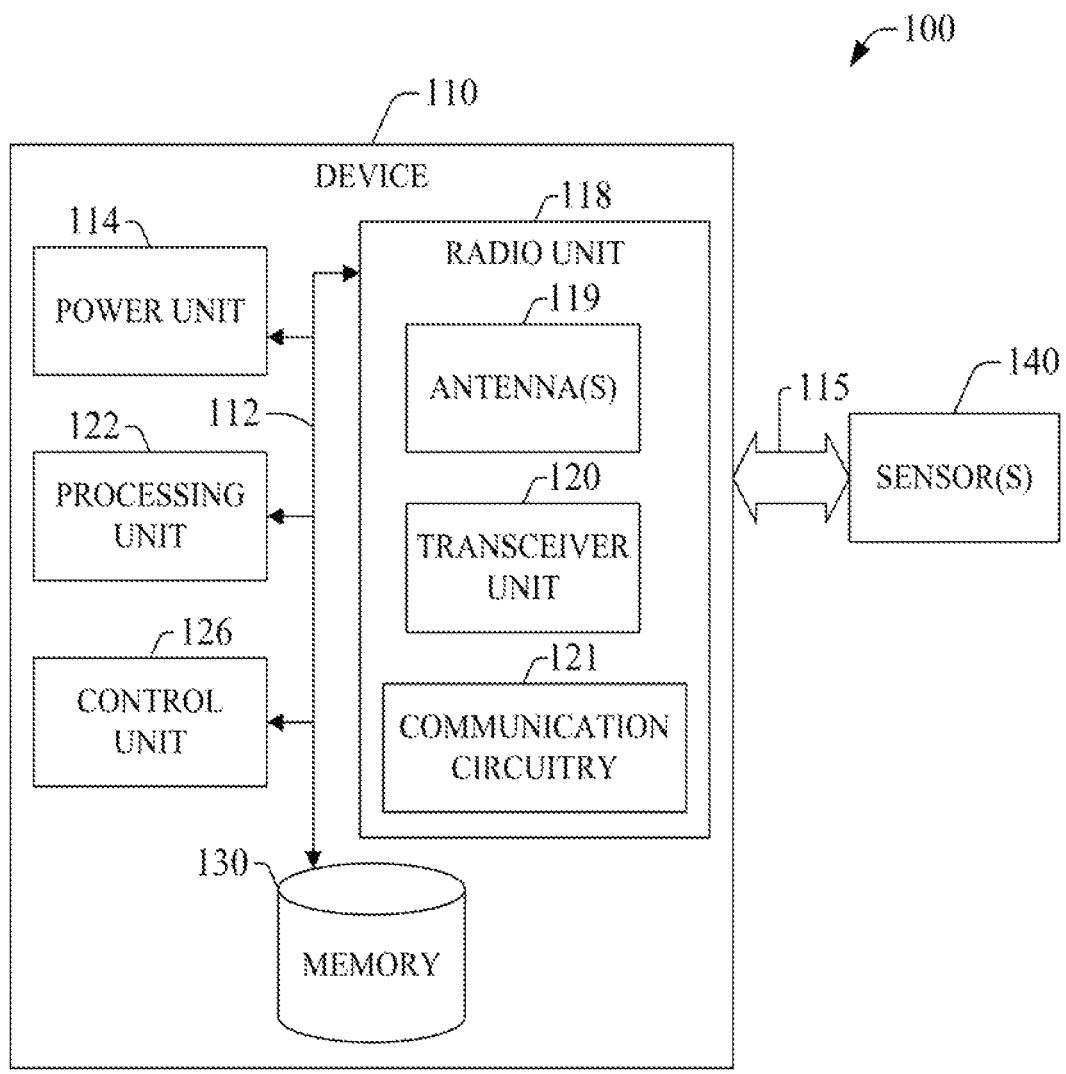
FIG. 1 illustrates a block diagram of an example embodiment of a sensor node in accordance with one or more aspects described herein.

The disclosure may be understood more readily by reference to the following detailed description of exemplary embodiments of the subject disclosure and to the figures and their previous and following description.

Before the present compounds, compositions, articles, systems, devices, and/or methods are disclosed and described, it is to be understood that the subject disclosure is not limited to specific systems and methods for long lifespan wireless sensors and sensor network formed with such sensors. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computing device or other programmable data processing apparatus to cause a series of operational steps to be performed on the computer or other programmable apparatus to produce a computer-implemented process such that the instructions that execute on the computing device or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computing devices (e.g., processing unit 122, control unit 126, and/or transceiver unit 120) that perform the specified functions or steps, or combinations of special purpose hardware and computer instructions.

In the subject specification and in the claims which follow, reference may be made to a number of terms which shall be defined to have the following meanings: "Optional" or "optionally" means that the subsequently described event or circumstance may or may not occur, and that the description includes instances where said event or circumstance occurs and instances where it does not.

As employed in this specification and annexed drawings, the terms "unit," "component," "interface," "system," "platform," "node," and the like are intended to include a computer-related entity or an entity related to an operational apparatus with one or more specific functionalities, wherein the computer-related entity or the entity related to the operational apparatus can be either hardware, a combination of hardware and software, software, or software in execution. One or more of such entities are also referred to as "functional elements." As an example, a unit may be, but is not limited to being, a process running on a processor, a processor, an object, an executable computer program, a thread of execution, a program, a memory (e.g., a hard disc drive), and/or a computer. As another example, a unit can be an apparatus with specific functionality provided by mechanical parts operated by electric or electronic circuitry which is operated by a software or a firmware application executed by a processor, wherein the processor can be internal or external to the apparatus and executes at least a part of the software or firmware application. In addition or in the alternative, a unit can provide specific functionality based on physical structure or specific arrangement of hardware elements. As yet another example, a unit can be an apparatus that provides specific functionality through electronic functional elements without mechanical parts, the electronic functional elements can include a processor therein to execute software or firmware that provides at least in part the functionality of the electronic functional elements. An illustration of such apparatus can be control circuitry, such as a programmable logic controller. The foregoing example and related illustrations are but a few examples and are not intended to be limiting. Moreover, while such illustrations are presented for a unit, the foregoing examples also apply to a component, a system, a platform, and the like. It is noted that in certain embodiments, or in connection with certain aspects or features thereof, the terms "unit," "component," "system," "interface," "platform," and "node" can be utilized interchangeably.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Reference will now be made in detail to the various embodiment(s), aspects, and features of the disclosure, example(s) of which are illustrated in the accompanying drawings. Wherever possible, the same reference numbers are used throughout the drawings to refer to the same or like parts.

As described in greater detail below, the disclosure relates, in one aspect, to wireless devices suitable for forming a sensor network deployed in operational environments with unreliable energy supply. In one aspect, the wireless devices have long lifespan. In certain embodiments, the sensor network comprises a plurality of sensor nodes, each sensor node comprising a wireless device and a sensor functionally coupled (e.g., attached or integrated) to the device. The sensor can collect information (digital data, analog data (e.g., modulated analog signals), etc.) from a specific environment and can transmit at least a portion of the information to the wireless device. The wireless device can receive such information and, based at least on one or more communication criteria, transmit available information (e.g., data retained in memory) to another device. To transmit information, depending on implementation, the device can broadcast the information, multicast the information, or unicast the information. In one aspect, the wireless device can transmit and/or receive signaling, such as pilot signals and control signals that can permit power management and/or data management. In another aspect, exchange of signaling with other wireless device(s) can enable self-healing information integrity.

Various embodiments of the disclosure can provide one or more advantages when compared to conventional wireless technologies for sensor network nodes. One exemplary advantage can include operation for extended periods (e.g., years or decades) with an intermittent and unreliable energy supply, and without having batteries or any other components replaced for the lifespan of the sensor. Another advantage can include the removal of environmentally hazardous materials (e.g. battery acid) from power units (or power sources) that energize conventional devices. Another exemplary advantage can include power management based on power available in an operational environment of a wireless node as described herein. Yet another exemplary advantage can include self-healing information integrity, which permits information propagation and availability throughout a portion or the entirety of a network formed with a plurality of wireless nodes as described herein.

FIG. 1 illustrates a block diagram of an example embodiment of a sensor node 100 in accordance with one or more aspects described herein. As illustrated, the sensor node 100 comprises a device 110 functionally coupled to one or more sensors 140 via a sensor unit 115 configured to receive sensor data from one or more sensors. For example, the sensor unit 115 can comprise a link such as a wired link (e.g., optical fiber, coaxial cable, HDMI cable, Universal Serial Bus (USB) cable, or the like) or a wireless link (e.g., satellite, radio wave, or the like). In certain embodiments, the sensor 140 can be integrated to the wireless device. In certain embodiments, networks comprising a plurality of sensor nodes having the functionality and architecture of the sensor node 100 can be formed and deployed. In one aspect, the sensor node 100 can embody an apparatus for collection and communication of information (e.g., data, metadata, signaling). The apparatus can be suitable for operation in an operational environment having unreliable energy supply.

The one or more sensor(s) 140 can collect one or more types of information (e.g., temperature, pressure, speed, photon count, moisture level, presence or absence of chemical species, or the like) and can supply at least a portion of such information in one or more formats, e.g., digital or analog. This can permit a sensor network comprising a sensor node 100 to distribute data from nearly any source. Examples of sensor(s) 140 include accelerometers (e.g., for measuring tilt of a pole, beam, or similar structure); amplified microphones (e.g., microcontroller performs Fast Fourier Transform (FFT) to analyze signal amplitudes at key frequencies to detect pipe leaks; the microphone can be sealed and can be buried with the pipe or mounted to a platform or hydrant); temperature gauge; color sensors (e.g., for probing vegetation/green-up); distance sensors; moisture sensors (e.g., including flood detection functionality); penetration sensors (e.g., which can be mounted to signage to detect projectile disruptions); or the like.

In one aspect, the sensor node 100 can be configured to identify one or more conditions based on the sensor data. For example, the sensor node 100 (e.g., the processing unit 122) can be configured to determine at least one of a flood condition based on sensor data from the moisture sensor, a structure tilt based on sensor data from the accelerometer, vegetation growth based on sensor data from the color sensor, and a pipe leak based on sensor data from the microphone, and the like. As an illustration, the processing unit 122 can comprise a microcontroller configured to perform analysis on acquired sensor data. The analysis can comprise acquiring data (e.g., either from a digital or analog source) and normalizing, calibrating, converting, or otherwise manipulating that data. For instance, a color measurement might be calibrated and then mapped to a brown-green color spectrum to determine how healthy vegetation. In another aspect, the analysis using audio data to perform leak detection can comprise using the processing unit 122 to collect a series of time-separated audio (e.g., pressure) measurements. Then a transform can be applied to this audio data to determine the intensity of audio at specified harmonics. In this way, a large collection of time-varying measurements can be distilled into a handful of useful values (e.g., the intensity at 50, 100, 200, 400, and 800 Hz) which can be easier to store and transmit than large amounts of raw data.

In one aspect, a plurality of sensor nodes 100 can be located (e.g., deployed, attached, scattered, fixed) in a geographic location. As an illustration, the plurality of sensor nodes 100 can be airdropped over a geographic location (e.g., combat area, remote area), released into a water source (e.g., rive, lake, ocean), affixed to highway structures, and the like. The sensor nodes 100 can comprise a variety of sensors 140. For example, each sensor node 100 can comprise the same sensors 140. In another aspect, different sensor nodes 100 can comprise different sensors 140. In one aspect, after deployment, the sensor nodes 100 can be initialized. During initialization, the sensor nodes 100 can collect initial sensor data from one or more of the sensors 140. The processing unit 122 can be configured to select which sensors 140 of the sensor node 100 receive the strongest signal, most accurate data, most useful reading, and/or otherwise most appropriate information. The processing unit 122 can be configured to select which sensors 140 of the sensor node 100 are best suited for a particular location at a particular time. For example, the processing unit 122 can make such selection based on the initial sensor data and/or other information (e.g., an instruction received from another sensor node or from a central source). For example, the sensor nodes 100 can collect data during the initialization process and compare the initial sensor data to reference data. In one aspect, the sensors 140 can be selected based on the amount of energy collected by a sensor node 100. In another aspect, sensor nodes 100 can be configured to broadcast which sensors 140 have been selected by the sensor node 100. Accordingly, the sensor nodes 100 can disable one or more of the sensors 140 based on which sensors 140 are selected by other sensor nodes 100. After selecting one or more sensors 140, the sensor node 100 can collect data from the selected sensors 140. Additionally, sensors 140 that are not selected can be disabled or placed in a low power mode. Furthermore, as conditions change, the sensor nodes 100 can enable and/or disable various sensors 140. These changes can be broadcast to other sensor nodes 100 causing other sensor nodes 100 to enable and/or disable sensors 140.

The device 110 can be a wireless device and can comprise a power unit 114 configured to collect energy, a radio unit (e.g., communication unit) 118 that can permit wireless communication (e.g., reception and transmission) of information, a processing unit 122, and a control unit 126 (also referred to as a controller), and memory (e.g., memory unit) 130. The memory 130 can be configured to store the sensor data. In one aspect, the radio unit 118 can comprise one or more antennas 119, a transceiver unit 120, and communication circuitry 121 suitable for processing wireless signal. For example, the transceiver unit 120 can comprise a wireless transceiver. Two or more of the antenna(s) 119, the transceiver unit 120, and the communication circuitry 121 can exchange information (data, metadata, signaling; via a bus (e.g., a bus similar to bus 112). The wireless transceiver can operate in various communication modes, such as single-input single-output (SISO), multiple-input multiple-output (AMMO), and/or multiple-input multiple-output (MISO). The wireless transceiver can communicate data according to one or more standardized radio technology (e.g., WiFi), including point-to-point communication. For example, the radio unit 118 can be configured to wirelessly broadcast the sensor data to one or more sensor nodes in a network of sensor nodes. As an illustration, radio unit 118 can be configured to receive sensor data from a first sensor node and transmit the sensor data from a first sensor node to a second sensor node. The first sensor node and the second sensor node can be configured as nodes in a network of sensor nodes configured to distribute the sensor data among the sensor nodes.

In another aspect, the power unit 114 can comprise a capacitive energy harvesting circuit (e.g., energy storage unit) that can store energy for operation of the device 110. The processing unit 122 can process data, converting analog information (e.g., analog signals) to digital information (e.g., digital data). For example, the device 110 can comprise an analog-to-digital converter configured to convert an analog value to a digital value. The analog value can comprise at least one of a voltage measurement of the energy and the sensor data from the sensor. In one aspect, the processing unit 122 can comprise the analog-to-digital converter. In one aspect, the memory 130 can comprise non-volatile memory capable of suitable for, a large number (e.g., billion or trillion) of rewrites and long data retention times (e.g., decades). The memory 130 can comprise information (e.g., data, metadata, or signaling, or combination thereof) received by the device 110 from at least one of the one or more sensors 140. The memory 130 also can comprise information received by the device 110 from a disparate device (e.g., another sensor node in a sensor network) having the structure and functionality of device 110 and being contained in a sensor node located at a specific distance from the device 110.

In certain embodiments, the processing unit 122 and the control unit 126 can be integrated into a single unit having at least one processor that can execute computer-accessible instructions, e.g., computer-readable and computer-executable instructions, and in response control operation of the device 110 and/or process data received by the device 110. In one aspect, processing data can comprise one or more of converting data from analog-to-digital, compressing data, restoring compressed data, up-converting data, down-converting data, performing combinations of such operations, or the like.

In general, the processing unit 122 can comprise any computing processing unit or processing device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally or alternatively, a processor of the processing unit 122, or the processing unit 122 itself, can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Such processor or the processing unit 122 also can be implemented as a combination of computing processing units.

As illustrated, the device 110 can include a system bus 112 that permits exchange of information between two or more units of the device 110 and between a unit and memory 130. The system bus 112 can comprise one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AG-P) bus, and a Peripheral Component Interconnects (PCI), a PCI-Express bus, a Personal Computer Memory Card Industry Association (PCMCIA), Universal Serial Bus (USB) and the like. It should be appreciated that the system bus 112, and all buses specified in this specification and annexed drawings also can be implemented over a wired or wireless network connection and each of the units, or sub-systems, of the device 110.

The device 110 also can comprise one or more Input/Output (I/O) interface(s) (not shown) that can permit connectivity of, at least, the sensor(s) 140 and the device 110. The I/O interface(s) also permit information (data, metadata, signaling) input into the device 110. For example, in case of a sensor of the sensor(s) 140 that provide analog data to the device 110, a suitable I/O interface of the one or more I/O interface(s) can include circuitry to collect the analog signal received from such sensor. Other I/O interfaces of the I/O interface(s) can permit collection of digital data, such as an HDMI.

In one aspect, based on complexity of the device 110, the I/O interface(s) can comprise information a variety of input devices, such as a camera; a keyboard; a microphone; a scanner (e.g., barcode scanner); a reader device such as a radiofrequency identification (RFID) readers or magnetic stripe readers; gesture-based input devices such as tactile input devices (e.g., touch screens), speech recognition devices, or natural interfaces; and the like.

In one operation scenario, the sensor node 100 can be disabled until sufficient energy has been stored in the power unit 114. For example, the power unit 114 can comprise a storage capacitor. The storage capacitor can be configured to store energy. In response to sufficient energy being available, the device 110 can receive a pulse of power. For example, the processing unit 122 can perform a variety of operations when a threshold value is reached. In one aspect, the threshold value can comprise a voltage value or other measurement of energy stored in the capacitor. For example, the voltage value can be 0.01, 0.5, 1, 3, 9, 12 Volts or the like. In one aspect, the threshold value can vary based on sensor application, available power, user preferences, and the like. For example; a sensor node 100 in an area with a large amount of light (e.g., a desert) can have a lower threshold value as compared to a sensor node 100 configured with a higher threshold value due to the sensor node's 100 location in an area with dense foliage or other obstructions. The threshold value can also vary according to the operation of the sensor node 100. For example, a sensor node 100 configured to transmit a large amount of data can be configured with a higher threshold value than a sensor node 100 configured to transmit a small amount of data that can be configured with a lower threshold value. The threshold value can vary based on the type of sensor 140 being used by the sensor node 100. For example, some sensors 140 can generate less sensor data than other sensors 140. Accordingly, sensors nodes 100 using sensors 140 that generate larger amount of data can have a higher threshold value than sensor nodes 100 using sensors 140 that generate a smaller amount of data.

As previously mentioned, in response to sufficient energy being available, the device 110 can receive a pulse of power. For the duration of such pulse (e.g., until the energy in the storage capacitor is reduced to a specific lower limit such as a threshold value) the sensor node 100, via the processing unit 122, for example, can perform analog-to-digital conversions of data received from the sensor(s) 140, retain converted data to the memory 130 (e.g., a non-volatile memory), receive data packets containing data from other sensor nodes (not shown in FIG. 1), transmit data packets containing data from the other sensor nodes and at least a portion of the converted data, and/or other operations.

Memory 130 can comprise a variety of computer readable media. Exemplary readable media can be any available media that is accessible by the processing unit 122 and/or the control unit 126 and comprises, for example and not meant to be limiting, both volatile and non-volatile media, removable and non-removable media. The memory 130 can comprise computer readable media in the form of volatile memory, such as random access memory (RAM), and/or non-volatile memory, such as read only memory (ROM). In certain embodiments, the memory 130 also can comprise non-volatile RAM, such as ferroelectric random access memory (FRAM). In addition to data received from the sensor(s) 140 or processed via the processing unit 122, the memory 130 can contain data and/or program modules for operation of device 110 in response to execution of such modules. The processing unit 122 and/or the control unit 126 can execute such program modules.

In another aspect, the memory 130 can comprise other removable/non-removable, volatile/non-volatile computer storage media. The memory 130 can provide non-volatile storage of computer code (e.g., computer-executable instructions), computer-readable instructions, data structures, program modules, and other data for operation of the device 110. Depending on complexity and/or cost constraints for the device 110, the memory 130 can be a hard disk, a removable magnetic disk, a removable optical disk, magnetic cassettes or other magnetic storage devices, flash memory cards, optical storage, random access memories (RAM), read only memories (ROM), electrically erasable programmable read-only memory (EEPROM), and the like.

As described herein, depending on complexity of the device 110, any number of program modules can be stored on the memory 130, including by way of example, an operating system, data management software, and/or power management software. Data and code (e.g., computer-executable instruction(s)) can be retained in the memory 130 as part of the data management software and/or the power management software.

Such program modules can be retained in a memory 130 as a group of computer-accessible instructions, computer-readable instructions, computer-executable instructions, or computer-readable computer-executable instructions. In one aspect, the group of computer-accessible instructions can encode the methods of the disclosure (such as the exemplary methods illustrated in FIGS. 4-7). In another aspect, the group of computer-accessible instructions can encode various formalisms (e.g., wireless communication protocols) for information processing and wireless communication. Certain implementations of the data management software and/or power management software can comprise a compiled instance of such computer-accessible instructions, a linked instance of such computer-accessible instructions, a compiled and linked instance of such computer-executable instructions, or an otherwise executable instance of the group of computer-accessible instructions. An implementation of the operating system, data management software, and/or power management software retained in the memory 130 or other memory elements (e.g., buffers, caches) of the sensor node 100 can implement the described functionality of the sensor node 100 in response to execution by a processor contained in the processing unit 122 and/or control unit 126.

In one aspect, implementation (e.g., execution by a processor) of data management can permit communication strategies that can permit all or nearly all sensor nodes in a sensor network having sensor nodes having the structure and functionality of the sensor node 100 to have access to all information (e.g., data) available in the sensor network. In another aspect, implementation of power management can permit a sensor node (e.g., 100) to determine an energy budget and to plan energy consumption by configuring the sensor node to operate at certain periods in low-power consumption modes. In addition or in the alternative, the sensor node (e.g., 100) can schedule specific times for transmission and/reception of data from other sensor nodes in a sensor network. For example, in certain embodiments, the sensor node (e.g., 100) can receive and/or transmit at least one time over a period of several minutes (e.g., 10 minutes). In another aspect, as part of power management, the sensor node (e.g., 100), via the control unit 126, can control periods in which the sensor node is OFF, permitting the sensor node to turn off cleanly without corrupting data that can be transmitted to other sensor nodes prior to the sensor node turning off or data that can be received from other sensor nodes prior to the sensor node turning off.

The processing effected in the disclosed sensor nodes and sensor networks formed with such nodes, systems and/or methods can be performed by software components, hardware components, and firmware components that combine hardware and software. In one aspect, the certain functionality of the disclosed sensor nodes and methods can be described in the general context of computer-executable instructions, such as program modules, being executed by one or more computing devices, such as processing unit 122, control unit 122, transceiver unit 120, communication circuitry 121, and/or other computing devices. Generally, program modules comprise computer code, routines, programs, objects, components, data structures, etc. that perform particular tasks or implement particular abstract data types. The disclosed methods also can be practiced in distributed computing environments—such as sensor networks formed by deploying a plurality of sensor nodes having the structure and functionality of sensor node 100 and in accordance with one or more aspects described herein.

The architecture of the device 110 can permit, in one aspect, operation of the device 110 even while powered by a small power source (such as a solar panel comprising solar cells configured to convert solar radiation into electrical energy in a low-light environment) and can permit, in another aspect, the device to remain completely or nearly completely unpowered for long periods of time. The state in which the device 110 is nearly completely unpowered can be referred to as a dormant state. In view of at least such aspects, device 110 can operate without batteries. Instead, the sensor node 100 can continue to operate for as long as the power unit 114 (e.g., an energy harvesting power source) can provide power, or energize the device 110, even in scenarios in which that power is substantially diminished.

In certain embodiments, sensor node 100 can be permanently encapsulated. Such features stems from the design of the sensor node 100. In view that performing maintenance (such as replacing batteries) is not necessary during the lifespan of the device 110, and depending on the type of attached sensor(s) 140, the entire sensor node 100 can be permanently encapsulated in epoxy, glass, and/or the like at the point of manufacture. As an example, solid state sensors accelerometers, compasses, gyroscopes, or the like) can be suitable for encapsulation. It should be appreciated that permanent or substantially permanent encapsulation of the sensor node 100 can render it extraordinarily resistant to exposure to the operational environment, thus permitting operation in harsh environments, such as open bodies of water or in the presence of toxic and/or corrosive chemicals where maintenance is impractical.

The sensor node 100 and sensor networks formed with a plurality of sensor nodes such as sensor node 100 can permit various monitoring applications. In general, such sensor network can be deployed to perform any form of remote signaling or sensing. Here, the term "remote" as applied to a remote environment refers to locations (e.g., terrestrial or extra-terrestrial; where access to a constant long-term power supply is unavailable and/or unreliable. In urban or suburban areas, such remote monitoring or remote sensing can comprise utility metering, especially with legacy systems which are entirely mechanical. For example, in certain geographic regions (e.g., certain areas in Alaska) it can be difficult to access utility meters (e.g., or other types of meter) to record monthly power and gas consumption, for example. The sensor nodes (e.g., sensor node 100) described herein and/or sensor networks comprising such sensor nodes can be attached or coupled to meters or regulators to report utility consumption for a neighborhood without the need for an inspector to use a spotting scope on every single house or climb through deep snow to get to a meter. It should be appreciated that the lifespan of the sensor node can be comparable to the lifespan of power and gas meters. In another aspect, in a scenario in which a sensor (e.g., one of sensor(s) 140) contained in the sensor node (e.g., 100) is a small CMOS camera, the sensor node can autonomously perform image analysis (of various complexities, ranging from simple to highly complex) to visually read (e.g., via computerized vision techniques) legacy meters autonomously. At least one benefit of the disclosed sensor nodes (e.g., sensor node 100) in connection with metering application is that it would not be necessary to puncture the exterior walls of a dwelling (e.g., a house or a multi-home building) and/or modify the dwelling's electrical wiring. As an additional or alternative application, rooftop monitoring for large buildings can be implemented via the sensor nodes and sensor networks formed with same, particularly in scenarios in which running power connections to a roof is prohibitively expensive.

In view of the features of the sensor node 100, such sensor can operate for extended periods (e.g., years or decades) with an intermittent and unreliable energy supply, and without having batteries or any other components replaced for the lifespan of the sensor. Accordingly, one exemplary advantageous use can include deployment and operation in remote environments where inspection and maintenance is costly. One example application of sensor node 100 can be monitoring of remote highway resources and utilities. In other example applications, power poles, culverts, bridges, signage, guardrails, luminaries, manholes, handholes, vegetation, wildlife intrusion, and the like can be monitored to provide information for risk assessment and maintenance scheduling.

It should be appreciated that the sensor nodes described herein, e.g., sensor node 100, differ from traditional sensor network nodes in at least three ways. First, there is no need to form a mesh network in the ordinary sense of the word. A specific sensor node does not need to have information associated with what other sensor nodes it is connected to or what other sensor nodes are available for the specific sensor node to connect to. Each sensor node in a sensor node network can simply attempt to broadcast all or substantially all of its stored data to any listening sensor node nearby, and can store all or substantially all data received from nearby sensor nodes. As each sensor node maintains a record of the most recent data from all other nodes on the network, there may be a need to transmit specific information to specific sensor network nodes in order for data to reach a destination. Second, data loss can be prevented in the event the network becomes disrupted. In one aspect, in a sensor network having sensor nodes as described herein, the most updated available data for each network node can always exist somewhere in the sensor network—even if such data exists on a single isolated sensor node—and in response to a gap (e.g., a connectivity disruption) in the network being filled (e.g., disruption being removed), the most recent data can be propagated through the sensor network from one or more sensor nodes having the most updated data. This feature can provide self-healing information integrity. This feature can be enabled, in certain implementations, by the utilization of long-lifespan non-volatile memory on all wireless devices included in sensor nodes, and the local storage (e.g., storage in memories included in the wireless devices) of all network data on each and every sensor node. Third, there are no requirements placed on the source of supply power for the sensor nodes described herein. No batteries, either for data retention or ordinary operation, are necessary. As long as there is a supply of electrical energy, however small or sporadic, a device (e.g., 110) in a sensor node (e.g., 100) can continue to operate. It should be appreciated that the performance of the sensor network may decrease as the average power supplied to the sensor nodes forming the network is diminished. In one aspect, by avoiding batteries, a sensor node of the disclosure can have idealized (e.g., theoretical) lifespans that substantively exceed electrochemically-powered alternatives.

Figure 2A:
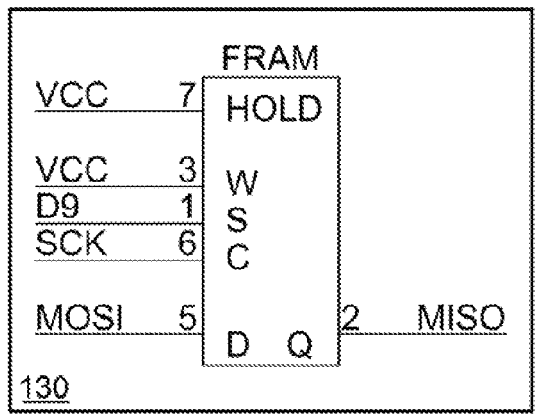
FIG. 2A is a diagram illustrating an example memory of an exemplary sensor node.
Figure 2B:
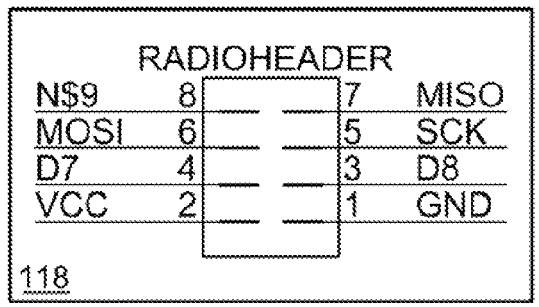
FIG. 2B is a diagram illustrating an example radio unit of an exemplary sensor node.
Figure 2C:
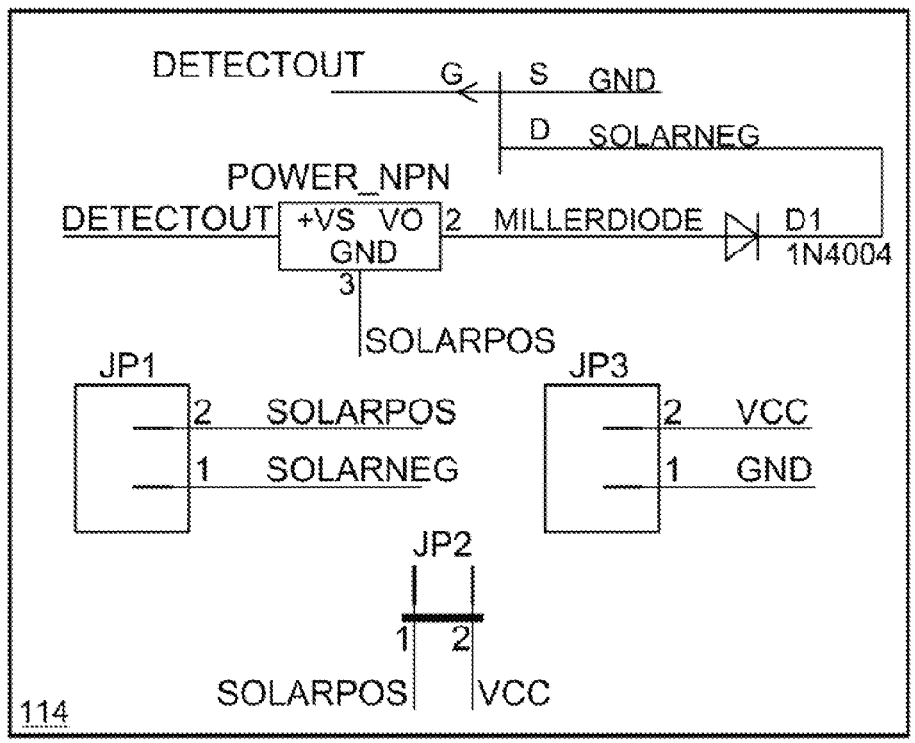
FIG. 2C is a diagram illustrating an example power unit of an exemplary sensor node.
Figure 2D:
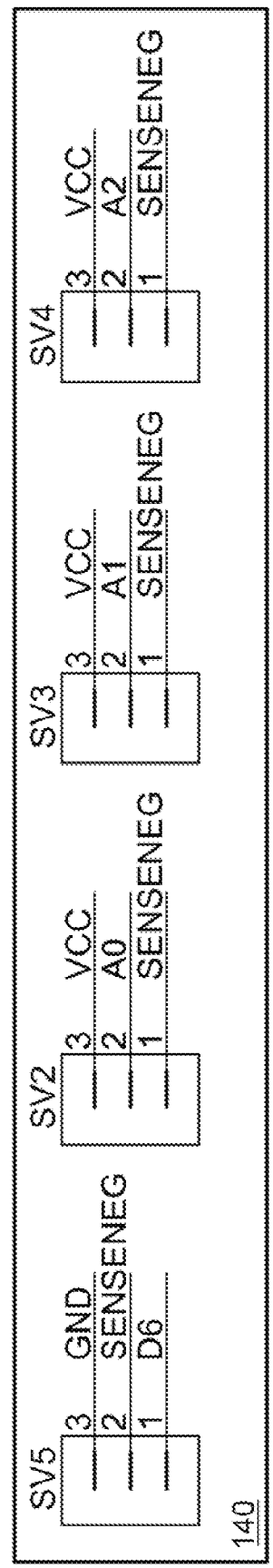
FIG. 2D is a diagram illustrating example sensors of an exemplary sensor node.
Figure 2E:
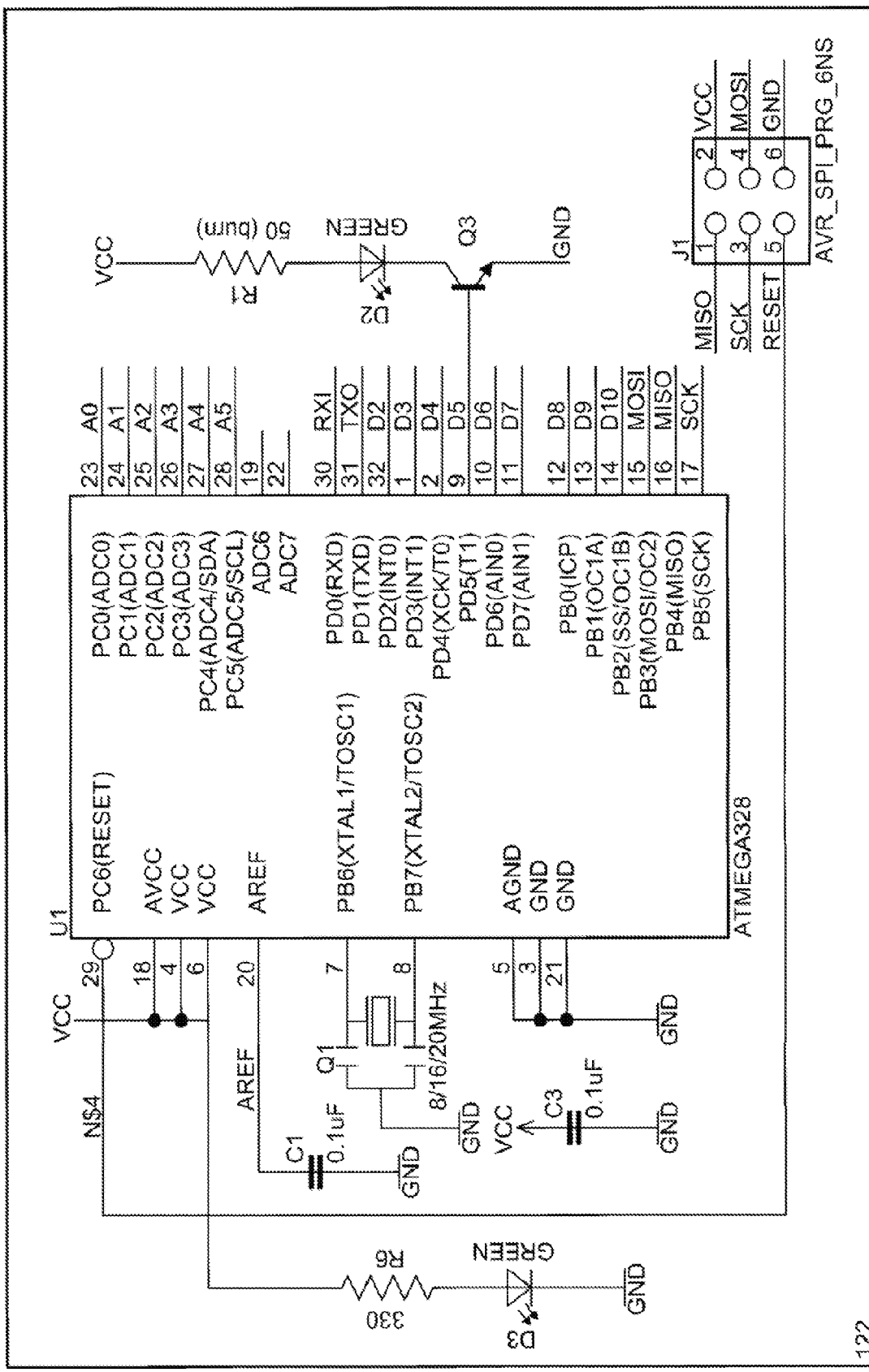
FIG. 2E is a diagram illustrating an example processing unit of an exemplary sensor node.

FIGS. 2A-2E show circuit diagrams illustrating an exemplary sensor node 100 in accordance with one or more aspects of the disclosure. In one aspect, various pins of circuit components are illustrated. For example, FIG. 2A shows an example memory 130. FIG. 2B shows an example radio unit 118. FIG. 2C shows an example power unit 114. FIG. 2D shows examples of sensors 140. As an illustration, the power unit 114 can comprise a Panasonic 1391 Voltage Comparator. As another illustration, the radio unit 118 can comprise a Nordic NRF24L01 transceiver. It should be noted that the antenna(s) are not illustrated in block 118 in FIG. 2B. As a further illustration, the memory 130 can comprise a Fujitsu 64 kb FRAM (MB85RS64PNF). FIG. 2E shows example parts of a processing unit 122. As an illustration, the processing unit 122 can comprise an ATMEL ATMEGA328P processing unit. In one aspect, one or more aspects of the control unit 126 can be implemented as part of the processing unit 122 illustrated in FIG. 2E. For example, the processing unit 122 can comprise an ATMEL ATMEGA328P controller. In one aspect, the processing unit 122 can comprise a microcontroller configured for internal or external analog and digital communication. For example, the processing unit 122 can comprise a Texas Instruments Stellaris M4F microcontroller, or other device configured to perform floating-point mathematical operations for complex signal analysis on sensor data. The sensor node 100 can also comprise an external analog-to-digital converter and/or a digital-to-analog converter.

Figure 3A:
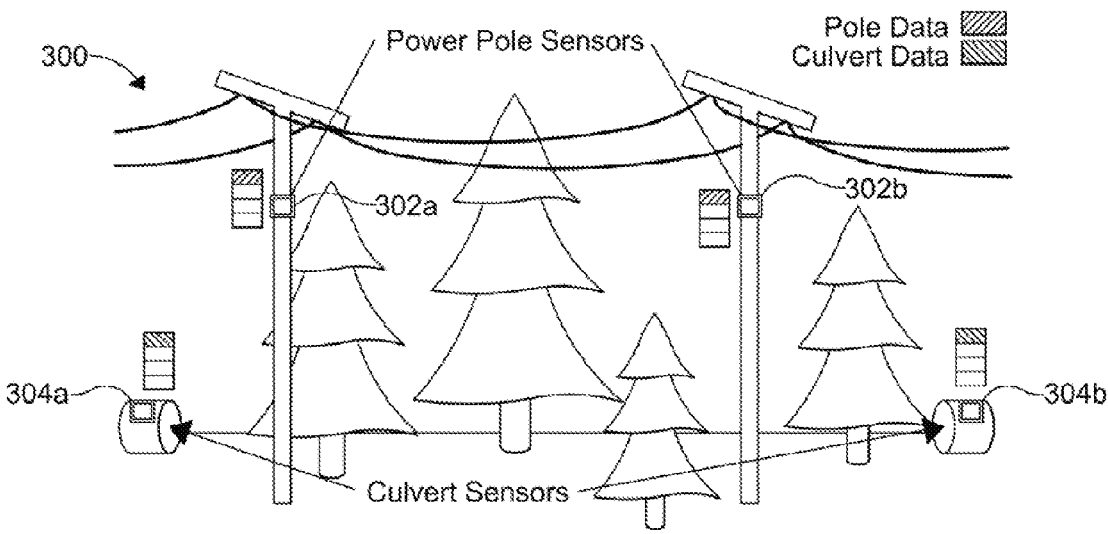
FIG. 3A is a diagram illustrating an example application scenario of a sensor network.
Figure 3B:
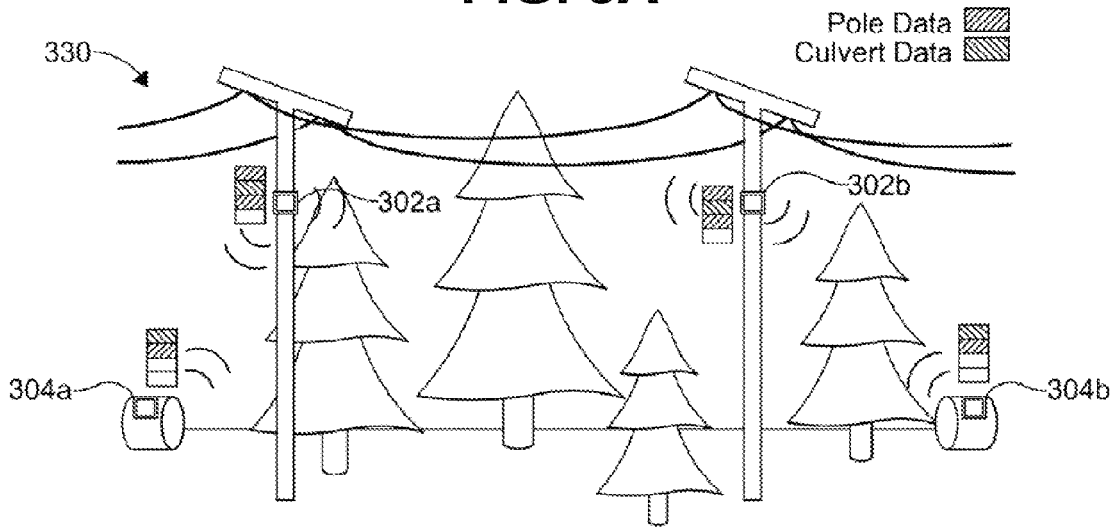
FIG. 3B is a diagram further illustrating an example application scenario of a sensor network.
Figure 3C:
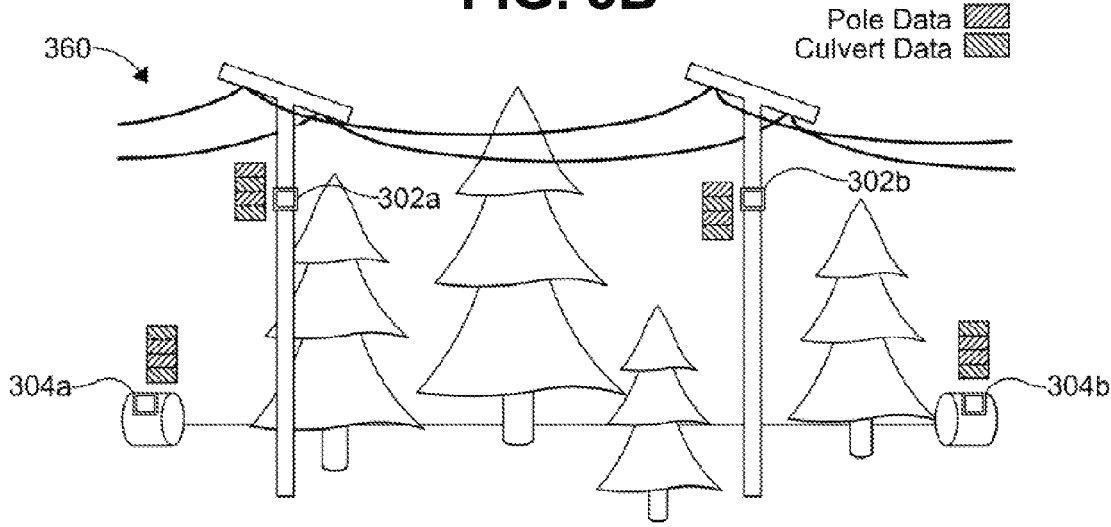
FIG. 3C is a diagram further illustrating an example application scenario of a sensor network.

FIGS. 3A-3C illustrate an example application scenario for a sensor network comprising a plurality of sensor nodes in accordance with one or more aspects of the disclosure. In the application scenario, sensor nodes 302a, 302b, 304a, 304b having various configurations (e.g., different types and/or structures for respective sensors) can be affixed or mounted to remote assets, such as power poles and culverts. The illustrated sensors can form at least a portion of a sensor network according to one or more aspects described herein. Initially, while power stored in the sensor nodes is below a predetermined threshold, the sensor nodes can store local data generated by sensors respectively coupled to sensor nodes. Different data types are represented by different boxes with different types of lines. Data available (e.g., retained) in a memory (e.g., memory 130) of the sensor nodes 302a, 302b, 304a, 304b is represented with respective pattern-coded blocks adjacent to each sensor node. In the initial state, each sensor node maintains locally measured values.

At certain time intervals, e.g., periodically, in response to energy storage capacitors being charged, for example, the sensor nodes can transmit data, or receive or listen for data. Data transmission and/or reception can be wireless (indicated with curved segments in panel 330). As time elapses, and as power units of sensor nodes charge, data can be transmitted to any sensor node within transmission range of any other nearby sensor node. It should be appreciated that transmission range can be determined by transmission (Tx) power of a transceiver contained in a sensor node. Thus, in one aspect, as energy in a power unit (e.g., unit 114) of a sensor node (e.g., 100) diminishes, a control unit (e.g., unit 126) of the sensor node can reduce Tx power accordingly. The reception and storage, in a sensor node, of data from a nearby sensor node is illustrated by the accumulation of pattern-coded blocks based on the type of data stored. For example, FIG. 3B illustrates more pattern-coded blocks than FIG. 3A, and FIG. 3C illustrates more pattern-coded blocks than FIG. 3A or FIG. 3B. In one aspect, a culvert-based sensor node can be adjacent, for example, to a power pole sensor node and can provide (e.g., collect, transmit, or collect and transmit) data to such power pole sensor node. Similarly, the power pole sensor node can provide data to the culvert-based sensor node. Thus, a memory (e.g., memory 130) of the culvert-based sensor node can retain data comprising data originally locally at the culvert-based sensor node and data originating at the power pole sensor data.

As shown in FIG. 3C, after sufficient time has elapsed, all sensor nodes that are part of the sensor network may have received data from all or substantially all other devices in the network. In such scenario, an agent (e.g., a passing vehicle or an agent with suitable equipment) can interrogate (e.g., or probe) a single sensor node to collect data associated with the entire sensor network. Additionally or alternatively, the sensor network can contain traditionally powered sensors (e.g., sensors having batteries) which can bridge the sensor network to a different type of communication network for data delivery.

In view of the aspects described hereinbefore, an exemplary method that can be implemented in accordance with the disclosed subject matter can be better appreciated with reference to the flowcharts in FIGS. 4-7. For purposes of simplicity of explanation, the exemplary methods disclosed herein are presented and described as a series of blocks or acts; however, it is to be understood and appreciated that the claimed subject matter is not limited by the order of block or acts, as some blocks or acts may occur in different orders and/or concurrently with other blocks or acts from that shown and described herein. For example, the various methods or processes of the subject disclosure can alternatively be represented as a series of interrelated states or events, such as in a state diagram. Furthermore, not all illustrated blocks or acts may be required to implement a method in accordance with the subject disclosure. Further yet, two or more of the disclosed methods or processes can be implemented in combination with each other, to accomplish one or more features or advantages herein described.

It should be further appreciated that the exemplary methods disclosed throughout the subject specification can be stored on an article of manufacture, or computer-readable medium, to facilitate transporting and transferring such methods to a computing device (e.g., a desktop computer, a mobile computer, a mobile telephone, a blade computer, a programmable logic controller, a processing unit, and the like) for execution, and thus implementation, by a processor of the computing device or for storage in a memory thereof or functionally coupled thereto.

Figure 4:
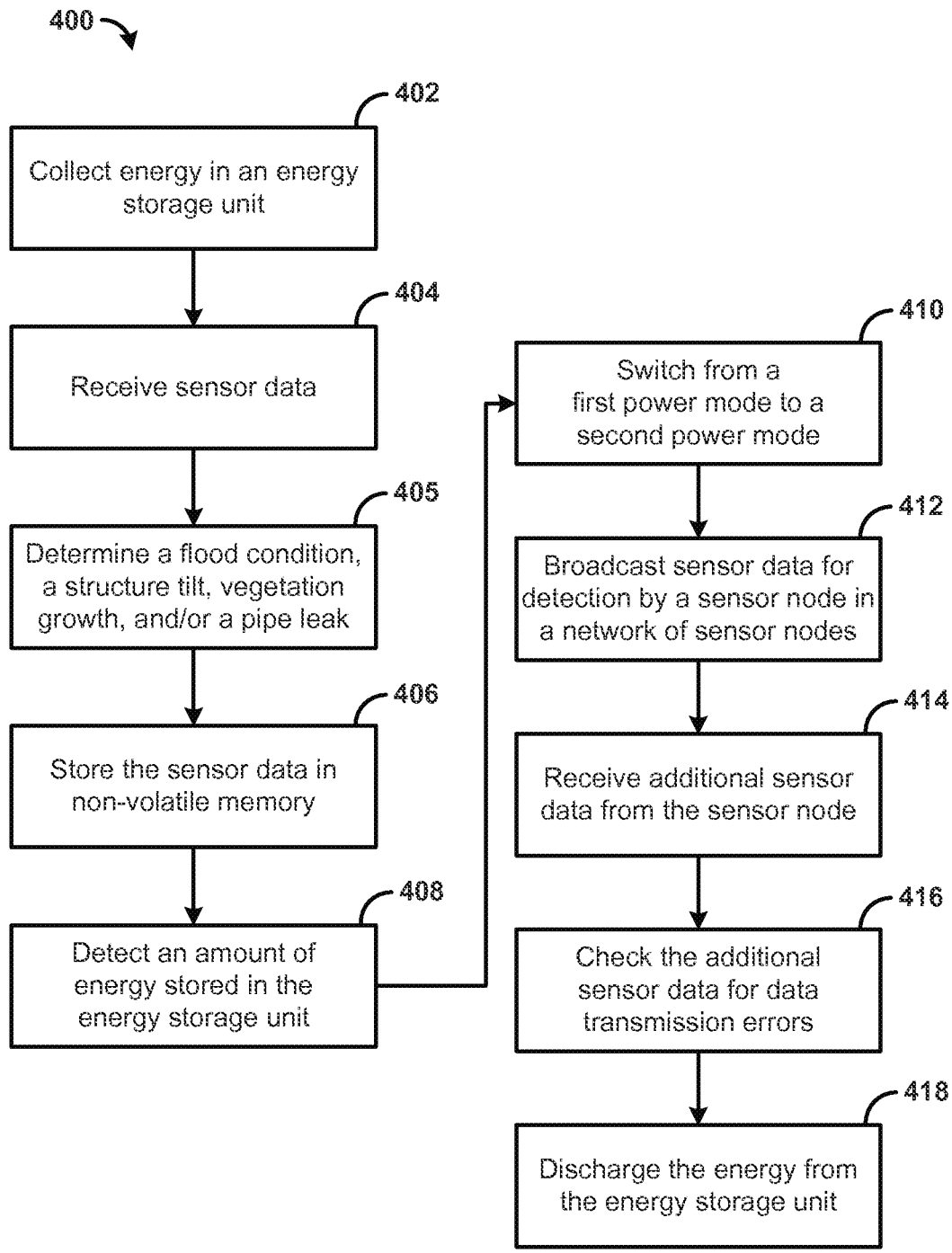
FIG. 4 is a flowchart illustrating an exemplary method for managing sensor information.

FIG. 4 is a flow chart illustrating an example method 400 for managing sensor information. In step 402, energy can be collected in an energy storage unit. For example, the energy storage unit can comprise the power unit 114 of FIG. 1. In one aspect, the energy storage unit can comprise a capacitor, and energy can be collected in the capacitor. In another aspect, the energy can be received from a solar cell configured to convert solar radiation into electrical energy. In another aspect, energy can be collected until at least one of a threshold of energy is reached and a predetermined time elapses. In step 404, sensor data can be received from a sensor. For example, the sensor can comprise at least one of an accelerometer, a microphone, a color sensor, a distance sensor, a moisture sensor, a penetration sensor, and the like. In step 405, at least one of a flood condition, a structure tilt, vegetation growth, and a pipe leak can be determined based on the sensor data. In step 406, the sensor data can be stored in non-volatile memory. For example, the sensor data can be stored in ferroelectric random access memory (FRAM), flash memory, and the like.

In step 408, an amount of the energy of the energy storage unit can be detected. For example, a voltage of the energy stored in the capacitor can be detected. In step 410, the apparatus can be switched from a first power mode (e.g., normal operation) to a second power mode (e.g., sleep mode). In one aspect, the sensor can consume more energy in the first power mode than in the second power mode. In step 412, the sensor data can be broadcasted for detection by a sensor node in a network of sensor nodes. In one aspect, the sensor data can be broadcasted at a power level based on the detected amount of the energy of the energy storage unit. In another aspect, and the sensor data can be broadcast through a wireless transceiver.

In step 414, additional sensor data can be received from the sensor node. For example, the additional sensor data can be received from the sensor node in the network of sensor nodes. The sensor node can be within wireless range of the device receiving additional sensor data. In step 416, the additional sensor data can be checked for data transmission errors. For example, a checksum value associated with the sensor data can be evaluated. In step 418, the energy from the energy storage unit can be discharged. For example, the energy can be discharged after the energy decreases to a minimum energy threshold. In one aspect, the discharge of the energy from the energy storage unit can cause steps of the method 400 to be repeated.

Figure 5:
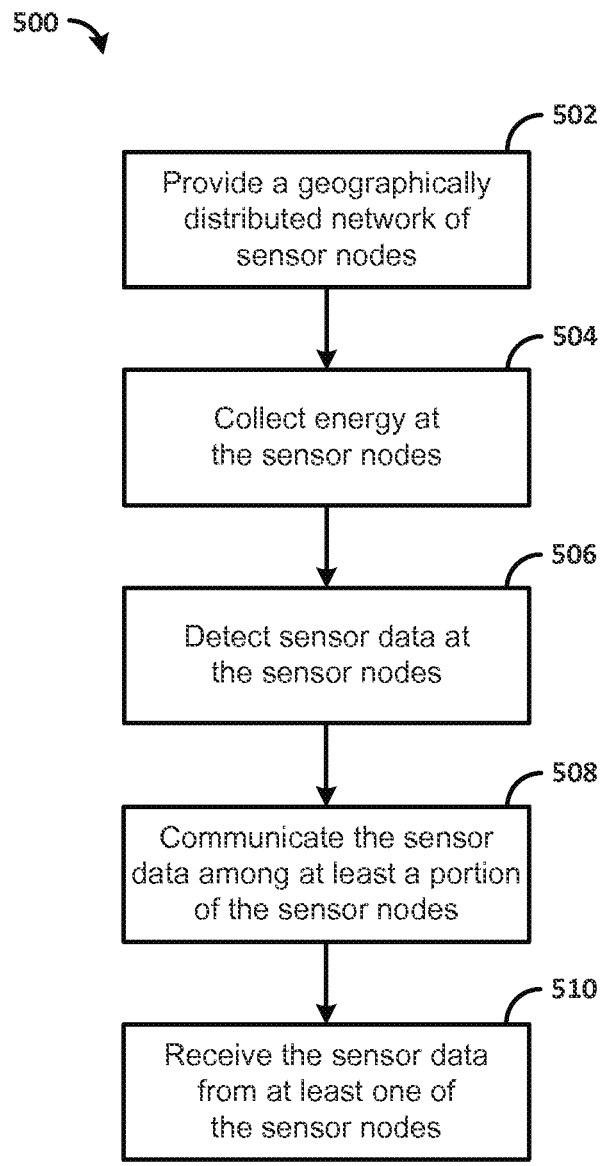
FIG. 5 is a flowchart illustrating an exemplary method for managing a sensor network.

FIG. 5 is a flowchart illustrating an example method 500 for managing a sensor network. In step 502, a geographically distributed network of sensor nodes can be provided. For example, the sensor nodes can be distributed such that at least one of the sensor nodes is within communication range of another of the sensor nodes, in one aspect, at least one of the sensor nodes can comprise a wireless transceiver, a power unit configured to collect energy, and a sensor. For example, the sensor can comprise at least one of an accelerometer, a microphone, a color sensor, a distance sensor, a moisture sensor, a penetration sensor, and the like, in one aspect, the at least one sensor node can be permanently encapsulated. For example, the at least one sensor node can be permanently encapsulated in at least one of glass, epoxy, and the like.

In step 504, energy can be collected at the sensor nodes. In one aspect, energy can be collected at the at least one sensor node from a solar cell configured to convert solar radiation into electrical energy. For example, the power unit can comprise a capacitor, and the collected energy can be stored in a capacitor. In step 506, sensor data can be detected at the sensor nodes. In one aspect, the sensor data can be stored in non-volatile memory. The non-volatile memory can comprise ferroelectric random access memory (FRAM), flash memory, and the like.

In step 508, the sensor data can be communicated among at least a portion of the sensor nodes. For example, the sensor data can be broadcasted by one or more of the sensor nodes. Once sensor data is received by one sensor node, the received sensor data can be stored at the sensor node. Then, the sensor node can broadcast the received sensor data, which can be received by another sensor node. Accordingly, sensor data can be gradually distributed among the sensor nodes. In step 510, the sensor data can be received from at least one of the sensor nodes. For example, the sensor data can be received by a polling device configured to travel proximate to one or more of the sensor nodes to receive the sensor data.

Figure 6A:
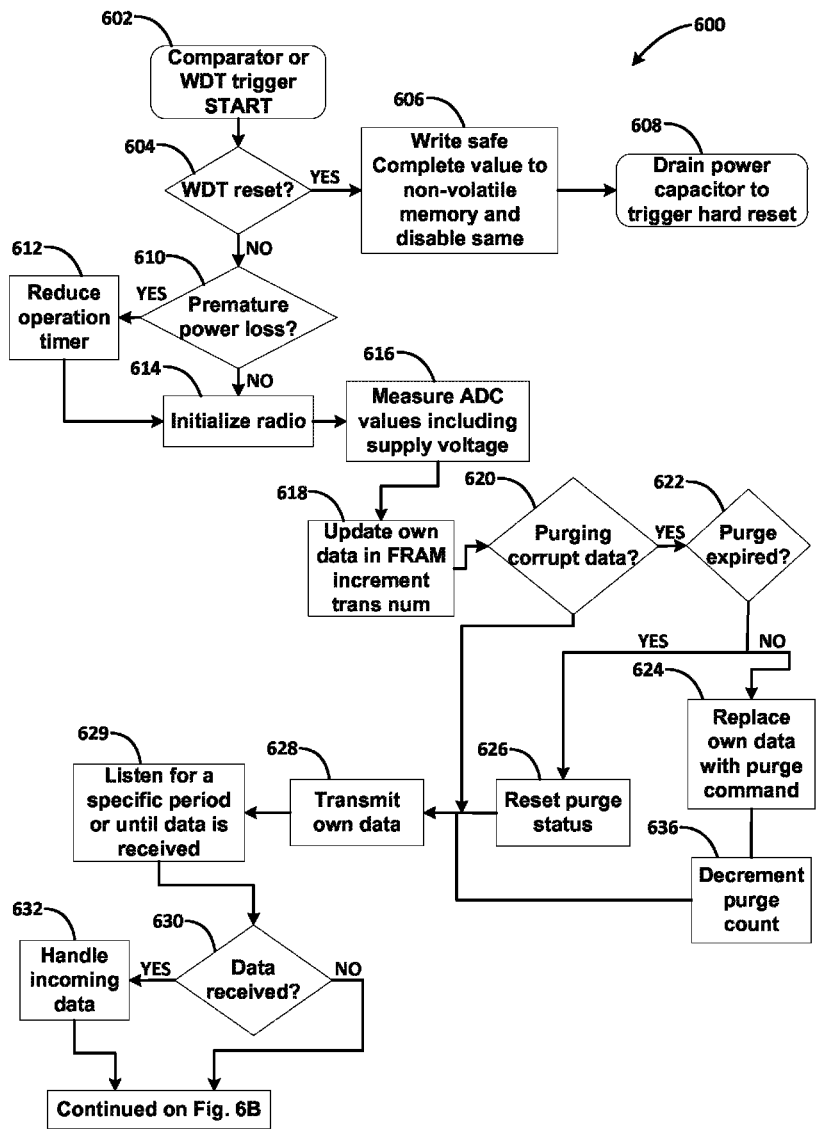
FIG. 6A is a flowchart illustrating an exemplary method in accordance with one or more aspects described herein.
Figure 6B:
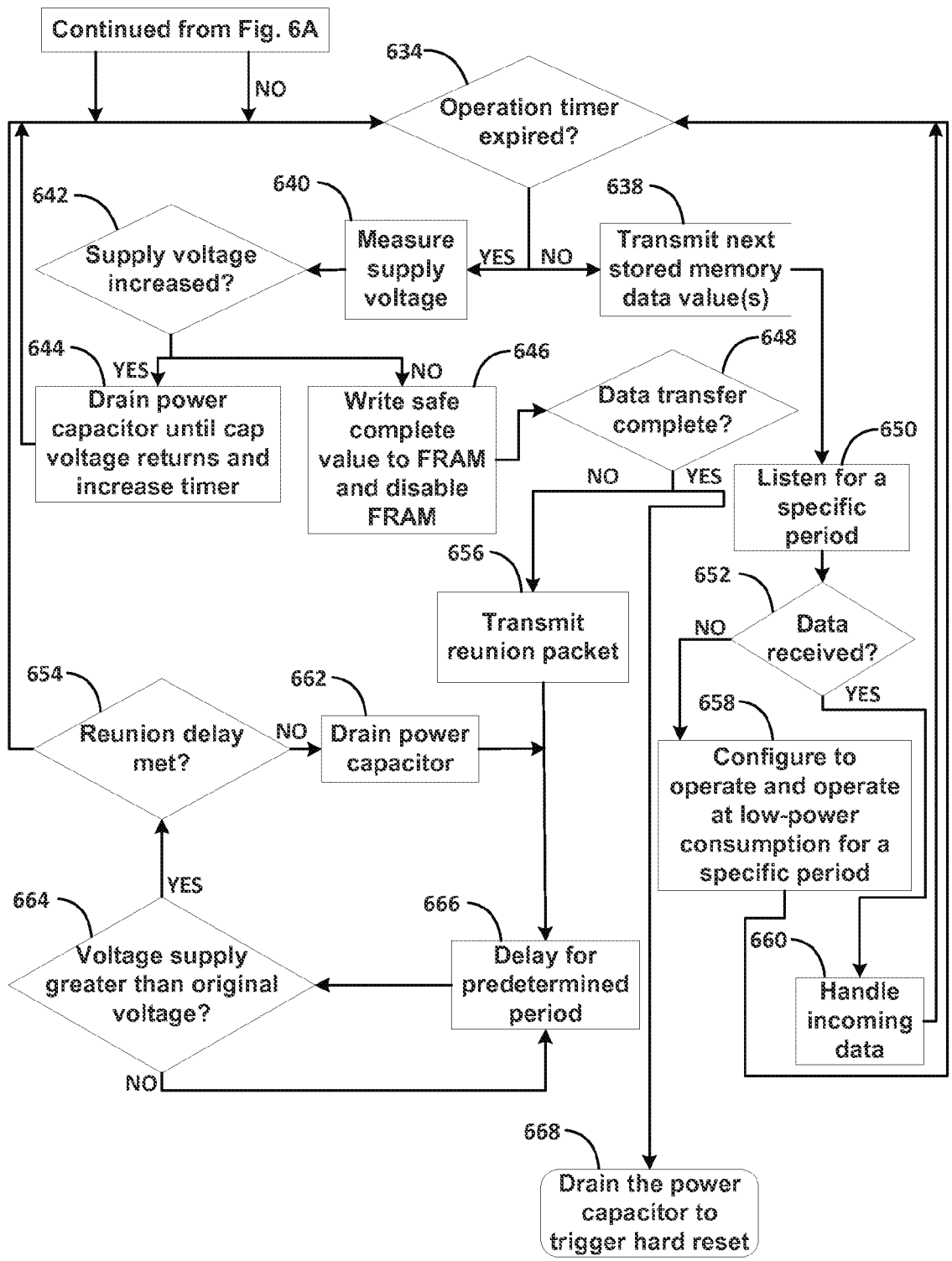
FIG. 6B is a flowchart further illustrating an exemplary method in accordance with one or more aspects described herein.

FIGS. 6A and 6B are flowcharts of an exemplary method 600 for collecting and transmitting information at a sensor node (e.g., 100) according to one or more aspects described herein. A processing unit (e.g., 122) and/or a control unit (e.g., 126) in the sensor node can implement, e.g., execute, one or more of the subject exemplary method. In addition, certain portions of the exemplary method 600 directed to data transmission and reception can be performed by a radio unit (e.g., 118) in the sensor node. As described herein, the information can comprise data, metadata, signaling, or any combination thereof. It should be appreciated that while the exemplary method 600 is illustrated with reception and transmission of data, communication of other information, such as metadata or signaling, can be implemented in similar fashion.

At 602 a comparator or a watchdog time (WDT) triggers the subject exemplary method. The WDT is a timer commonly utilized in embedded electronics and can restart program execution (e.g., execution of computer-accessible instructions) in the event of an unexpected or unplanned delay in program execution.

At 604 it is determined if a WTD is reset condition is present. For example, the WTD can comprise a flag or time value stored in non-volatile memory upon startup of the sensor node. The WTD can be reset upon proper operation completion and shutdown. If the sensor node turns on and the WTD is still set, then the sensor node did not properly shutdown (e.g., indicating the previous shutdown was the result of a watchdog interrupt). Accordingly, the WTD can be read to determine if the device shutdown properly. In the affirmative case, at 606, a complete value of data is written to a non-volatile memory (e.g., a FRAM; memory 130) and the non-volatile memory is disabled. At 608, a power capacitor for energy harvesting in the sensor node is drained in order to trigger a hard reset. For example an LED and/or resistor (e.g., in series) can drain the power from the capacitor. However, any circuit component or device that drains power can be used. As an illustration, a 1 watt resistor can be used to drain the power. In one aspect, a hard reset is a reset where the power to the primary controller is removed by a power control circuit (e.g., instead of a reset caused by a signal to the reset pin of the device or code that causes the controller to reset). In one aspect, cutting power to the device (e.g., the supplied current=0 amps) can provide a way to cause any inexpensive microcontroller or other circuit component which may not have a very low power power-down mode sleep mode) to consume no power. In one aspect, the solar panel can continue to provide current to the sensor during the hard reset. In another aspect, the hard reset (e.g., where no power is provided to the microcontroller and sensor devices) can occur when the voltage across the capacitor (e.g., which is constantly being supplied current by the solar panels) drops below a certain voltage threshold (e.g., determined by the specified voltage threshold of the Panasonic 138(0/1/2) or other similar device).

In one aspect, the capacitor can be contained in a power unit (e.g., 114) of the sensor node. The terms "draining" or "burning" as utilized in the subject disclosure refer to removal of stored electrical potential energy. In a scenario in which it is determined that a WTD is not present, flow is directed to 610, at which it is determined if premature power loss has occurred. In the affirmative case, an operation timer is reduced. For example, the operation timer can establish time available for operation of the sensor node based on power available to the sensor node. In the negating case, a radio unit (e.g., 118) in the sensor node is initialized at 614. At 616, analog-to-digital converter (ADC) values are measured, such values can include supply voltage. In one aspect, the ADC can convert an analog voltage or current signal into a digital value, and can include one or more multiplexers to permit conversion of analog signals at multiple physical inputs, such as information inputs from a plurality of sensors. In certain embodiments, the ADC can buffer information (e.g., data, metadata, signaling) prior to the processing unit that implements (e.g., executes) the subject exemplary method 600 measuring ADC values. In certain implementations, such processing unit can comprise or embody the ADC.

At 618, data in the non-volatile memory of the sensor node is updated with local information (e.g., local data) generated by one or more sensors, and a transaction number can be incremented. The local information obtained through the measurements at 616. At 620, it is determined if corrupt data is being purged. In one aspect, each sensor node can be is configured to identify when data corresponding to the sensor node has been corrupted. For example, data records can be supplied and/or associated with a unique log number to compare data to see which data is newer. Additionally, each sensor node can be associated with a unique number. The sensor node can determine based on the log number and sensor node number if its data has been corrupted. For example, the sensor node can receive data having a first log number and a first sensor node number. If the first sensor node number matches the sensor node number of the sensor node, the sensor node can compare the current log number of the sensor node to the first log number. Based on this comparison, the sensor node can identify the data as corrupt. For example, if the first log number is higher than the current log number, then the data can be identified as corrupt. As an illustration, if sensor node number X is has a current log number Y and another sensor node transmits data to sensor node number X with a record associated with sensor node X that has a log number Z, the sensor node can identify this data as corrupt (e.g., if Z is greater than Y). When a sensor node identifies corrupt data (e.g., data that originated with the sensor node and subsequently became corrupt) on the network, the sensor node can switch into a new mode of operation. The sensor node can spend the next several transmission cycles attempting to purge the corrupt data about itself from the network. For example, the sensor node can transmit a purge packet haying a purge packet identifier (e.g., record number of 0) which all sensor nodes identify as a signal to reset stored data for that particular node number. In the affirmative case, at 622 it is determined if purging has expired. In response to expiration, purge status is reset at 626 and flow directed to 628. In the alternative, in response to the purging not being expired, information (e.g., data) available locally to the sensor node (e.g., "own data") is replaced with a purge command. The information available locally can be generated at the sensor node or can be information that is retained at the sensor node but has been received from a disparate sensor node in a sensor network. At 636, a purge count is decremented and flow is directed to 628.

At block 628, data available locally (e.g., "own data") is transmitted. A radio unit (e.g., 118) in the sensor node that implements the exemplary method 600 can implement act 628. At 629, the sensor node can listen or can be configured to receive data for a specific period 50 ms) or until data is received. In one aspect, the data can be received from other sensor node(s) in a sensor network having the sensor node that listens for data. Values of the specific period can be retained in a memory of the sensor node that implements the exemplary method 600. In addition or in the alternative, in another aspect, a control unit (e.g., 126) of the sensor node can have the value of the specific period in a buffer therein. Yet as another alternative or a further addition, a processing unit (e.g., 122) can have the value of the specific period in a buffer therein. At 630, it is determined if data is received and, in the affirmative case, incoming data is processed at 632. In the negative case, if data is not received, flow is directed to 634.

At 634, it is determined if operation timer is expired. For example, the operation timer can count clock cycles. Based on this count of clock cycles, the sensor node can determine how long the sensor node has been in operation. In one aspect, determining if the operation time is expired can comprise comparing the current clock cycle (e.g., count of clock cycles) to a pre-defined operation length and/or clock cycle. As an illustration, if the sensor node is operating at 8 MHz and is intended to run for 8 seconds, the operation timer can expire as soon as the operation time counts up to 64,000,000 clock cycles (e.g., 8,000,000 cycles per second times 8 seconds). As described herein, expiration of the operation timer can signal termination of one operation cycle of the sensor node. In response to the operation timer not being expired, the sensor node can transmit further information (data, metadata, signaling, etc.). In one aspect, at 638, next stored data value(s) are transmitted. At 650, the sensor node can listen—or can be configured to receive data—for a specific period (e.g., 3 ms). Values of the specific period can be retained in a memory of the sensor node that implements the exemplary method 600. In addition or in the alternative, in another aspect, a control unit (e.g., 126) of the sensor node can have the value of the specific period in a buffer therein. Yet as another alternative or a further addition, a processing unit (e.g., 122) can have the value of the specific period in a buffer therein. At 652, it is determined if the data is received and, in the affirmative case, incoming data is processed at 660. In the alternative, in response to data not being received, the sensor node is configured (e.g., switches), at 658, to a low-power consumption mode and remains in such mode for a predetermined period (e.g., 50 ms or less than 50 ms). Values of the predetermined period can be retained in a memory of the sensor node that implements the exemplary method 600. In addition or in the alternative, in another aspect, a control unit (e.g., 126) of the sensor node can have the value of the predetermined period in a buffer therein. Yet as another alternative or a further addition, a processing unit (e.g., 122) can have the value of the predetermined period in a buffer therein. Such configuration and operation in low-power consumption is referred to "sleep mode" in which the sensor can "sleep" for the specific period.

In the alternative, in response to the operation timer being expired, supply voltage is measured at 640. In one aspect, a control unit (e.g., 126) in the sensor node can perform such measurement(s). At 642 it is determined if supply voltage is increased. In the affirmative case, at 644, the power capacitor is drained until voltage supply is lowered to a cap voltage, and the operation timer is increased. Subsequently, flow is directed to 634. In the negative case, at 646, a complete value of data is written to a non-volatile memory (e.g., a FRAM; memory 130) and the non-volatile memory is disabled. At 648, it is determined if data transfer is complete. In the affirmative case, the power capacitor is drained in order to trigger a hard reset. In the negative case, a reunion packet is transmitted at 656. In one aspect, the reunion packet can be configured facilitate communication between two sensor nodes in the event one of the sensor nodes runs out of power before a communication is complete. When two sensor nodes communicate, each sensor node can be configured to send and receive a specified amount of packets (e.g., 256-512) to fully exchange data. In some instances, one sensor node can run out of power before all packets have been exchanged. Accordingly, the reunion packet can comprise a command that one sensor node sends to another sensor node to indicate that a power-down is imminent or other similar power information. The command can instruct the sensor node receiving the reunion packet to attempt to switch to a low power mode of operation so the energy-deficient sensor node (e.g. sensor node sending the reunion packet) can recharge. During this low power mode, the non-depleted sensor node (e.g., sensor node receiving the reunion packet) can be configured to operate such that the non-depleted sensor node does not exceed an upper voltage threshold or other similar metric indicating power usage. Both sensor nodes can be configured to resume transmission after a specified period of time (e.g., a time specified in the reunion packet or by hard-coded device design). In one aspect, the radio unit can transmit such packet. At 666, further processing is delayed for a predetermined period and flow is directed to 664, at which it is determined if voltage supply is greater than an original, or starting, voltage. In the negative case, flow is directed to 666 and a further delay is implemented prior to performing 664 another time. In the affirmative case, at 654, it is determined if a reunion delay if fulfilled. In one aspect, the reunion delay can comprise an agreed upon time that two sensor nodes will wait in a low power mode without transmitting or receiving in order to allow one or both of the sensor nodes to recharge. In the negative case, at 662, the power capacitor is drained and flow is directed to 666. In the affirmative case, in response to the reunion delay having elapsed, flow is directed to 634.

Figure 7:
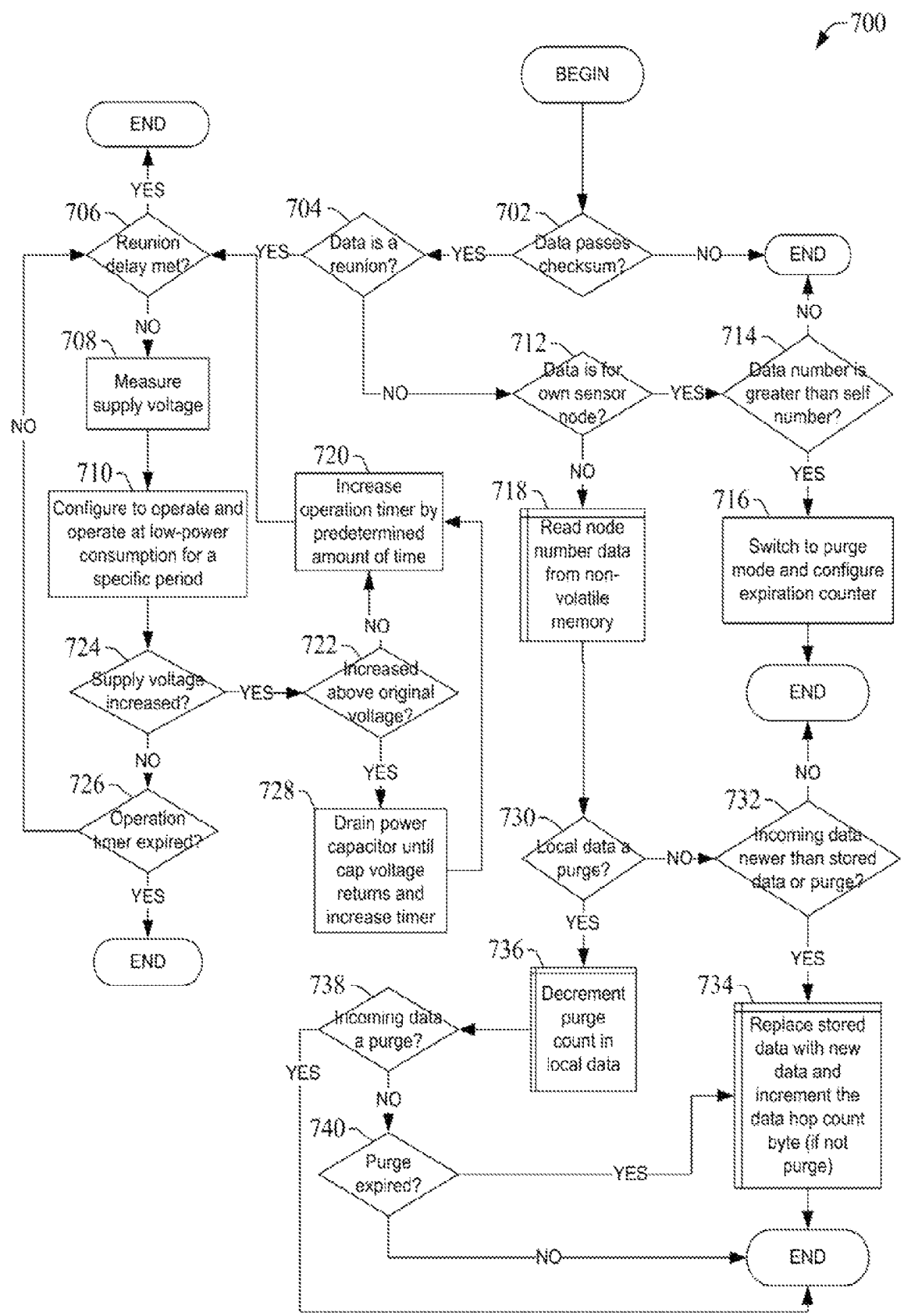
FIG. 7 is a flowchart illustrating another exemplary method in accordance with one or more aspects described herein.

FIG. 7 is a flowchart of an exemplary method 700 for managing information available received, retained, and/or transmitted) at sensor node (e.g., 100) according to one or more aspects described herein. A processing unit (e.g., 122) and/or a control unit (e.g., 126) in the sensor node can implement, e.g., execute, one or more of the subject exemplary method. In addition, certain portions of the exemplary method 700 directed to data transmission and reception can be performed by a radio unit (e.g., 118) in the sensor node. As described herein, the information can comprise data, metadata, signaling, or any combination thereof. In one embodiment, the subject exemplary method can embody or can comprise acts 632 or acts 660. At 702 it is determined if data passes a checksum or other methods suitable to test data integrity. In one aspect, the data can be generated locally, via a sensor functionally coupled to or integrated into the sensor node. In another aspect, the data can be received from another sensor node in a sensor network. If the data fails the checksum, the data may be corrupted and the exemplary method ends. In the alternative, at 704, it is determined if the data is a reunion, e.g., data received from one or more sensor nodes in a sensor network having the sensor node that implements the exemplary method 700. In response to the data being a reunion, at 706 it is determined if a reunion delay is fulfilled. In the affirmative case, the exemplary method 700 ends. In the alternative, flow is directed to 708, at which a voltage supply is measured. A control unit (e.g., 126) in the sensor node can measure such voltage. At 710, the sensor node is configured (e.g., switches), at 658, to a low-power consumption mode and remains in such mode for a predetermined period (e.g., 50 ms or less than 50 ms). Such configuration and operation in low-power consumption is referred to "sleep mode" in which the sensor can "sleep" for the specific period. At 724, it is determined if supply voltage is increased and, in the affirmative case, at 722, it is determined if such voltage has increased above an original, or initial, value. In the negative case, at 720, operation timer is increased by a predetermined amount of time and flow is directed to 706. In the affirmative case, in response to the supply voltage increasing above the initial voltage, flow is directed to 728 at which a power capacitor is drained until voltage supply is lowered to a cap voltage, and the operation timer is increased. Subsequently, flow is directed to 720.

In a negative outcome of 724, namely, in response to the supply voltage not being increased, flow is directed to 726 at which it is determined if the operation timer is expired. In the affirmative case, the exemplary method ends. Yet, in the negative case, flow is directed to 706.

In the alternative, in response to the data not being a reunion, flow is directed to 712, at which it is determined if data is for own sensor node. In the affirmative case, at 714, it is determined if the data number is greater than self number (e.g., number or identifier of the sensor node implementing the subject exemplary method). In response to the data number not being greater than the self number, the exemplary method 700 ends. In response to the data number being greater than the self number, the sensor node is switched to purge mode and an expiration counter is configured, and the exemplary method 700 ends.

In response to the data being determined to be for own sensor node, at 718, sensor node number is read from non-volatile memory (e.g., FRAM; memory 130). At 730 it is determined if local data is purge data and, in the affirmative case, a purge count in local data is decremented at 736. In one aspect, a processing unit (e.g., 122) that is contained in the sensor node can perform such decrement. In the negative case, at 732, it is determined if incoming data is newer than stored data or purge data. In response to establishing that the incoming data is not newer, the exemplary method 700 ends. Yet, in response to the incoming being newer than stored data or purge data, at 734, stored data is replaced with the incoming data and a data hop count byte is incremented. In one aspect, a processing unit (e.g., 122) that is contained in the sensor node can perform such replacement and increment.

In response to performance of 736, it can be determined, at 738, if the incoming data is purge data. In the affirmative case, the exemplary method ends. In the negative case, at 740, it is determined if the purge is expired and, in the affirmative case, flow is directed to 734.

It should be appreciated that implementation (e.g., execution) of the exemplary methods 400, 500, 600, and 700 can permit implementation of data management and power management for a sensor node (e.g., sensor node 100) in accordance with various aspects described herein.

In various embodiments, the systems and methods of the subject disclosure for weighing an object through, at least in part, computer-vision tracking can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., expert inference rules generated through a neural network or production rules from statistical learning).

While the systems, devices, apparatuses, protocols, processes, and methods have been described in connection with exemplary embodiments and specific illustrations, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where description of a process or method does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent to those skilled in the art that various modifications and variations can be made in the subject disclosure without departing from the scope or spirit of the subject disclosure. Other embodiments of the subject disclosure will be apparent to those skilled in the art from consideration of the specification and practice of the subject disclosure as disclosed herein. It is intended that the specification and examples be considered as non-limiting illustrations only, with a true scope and spirit of the subject disclosure being indicated by the following claims.

What is claimed is:

1. An apparatus, comprising:
   a power unit configured to collect energy in a capacitor, wherein the power unit is configured to charge the capacitor at least until a threshold value is reached, and wherein the power unit is configured to discharge the energy from the capacitor after the energy decreases to a minimum energy threshold;
   a sensor unit configured to receive sensor data from a sensor;
   a memory unit configured to store the sensor data in non-volatile memory;
   a communication unit configured to wirelessly broadcast the sensor data to one or more sensor nodes in a network of sensor nodes; and
   a processing unit configured to operate at least one of the sensor unit, the memory unit, and the communication unit after the energy collected in the power unit reaches the threshold value.

2. The apparatus of claim 1, wherein the power unit comprises a solar cell configured to convert solar radiation into electrical energy.

3. The apparatus of claim 1, wherein the communication unit is configured to receive sensor data from a first sensor node and transmit the sensor data from the first sensor node to a second sensor node, and wherein the first sensor node and the second sensor node are configured as nodes in the network of sensor nodes, and wherein the network of sensor nodes is configured to distribute the sensor data among the sensor nodes.

4. The apparatus of claim 1, wherein the processing unit is configured to operate at least one of the sensor unit, the memory unit, and the communication unit until the power unit is drained a threshold amount of energy.

5. The apparatus of claim 1, wherein the sensor comprises at least one of an accelerometer, a microphone, a color sensor, a distance sensor, a moisture sensor, and a penetration sensor, and wherein the processing unit is configured to determine at least one of a flood condition based on sensor data from the moisture sensor, a structure tilt based on sensor data from the accelerometer, vegetation growth based on sensor data from the color sensor, and a pipe leak based on sensor data from the microphone.

6. The apparatus of claim 1, wherein the non-volatile memory comprises ferroelectric random access memory.

7. The apparatus of claim 1, further comprising an analog-to-digital converter configured to convert an analog value to a digital value, wherein the analog value comprises at least one of a voltage measurement of the energy and the sensor data from the sensor.

8. A method for managing sensor information, comprising:
collecting energy in an energy storage unit comprising a capacitor, wherein collecting energy in the energy storage unit comprises collecting energy in the capacitor until at least one of a threshold of energy is reached and a predetermined time elapses;
receiving sensor data from a sensor;
storing the sensor data in non-volatile memory;
analyzing the sensor data to detect at least one of a pipe leak based on sound data of the sensor data, a vegetation condition based on image data of the sensor data, and a tilt of a structure based on accelerometer data of the sensor data;
broadcasting the sensor data for detection by a sensor node in a network of sensor nodes;
receiving additional sensor data from the sensor node; and
discharging the energy from the capacitor after the energy decreases to a minimum energy threshold.

9. The method of claim 8, further comprising switching from a first power mode to a second power mode, wherein the sensor consumes more energy in the first power mode than in the second power mode.

10. The method of claim 8, further comprising checking the sensor data for data transmission errors, wherein checking the sensor data for transmission errors comprises evaluating a checksum value associated with the sensor data.

11. The method of claim 8, wherein collecting energy in the energy storage unit comprises receiving the energy from a solar cell configured to convert solar radiation into electrical energy, and wherein broadcasting the sensor data for detection by the sensor node in a network of sensor nodes comprises broadcasting the sensor data through a wireless transceiver.

12. The method of claim 8, further comprising detecting an amount of the energy of the energy storage unit, wherein broadcasting the sensor data for detection by a sensor node in a network of sensor nodes comprises broadcasting the sensor data at a power level based on the detected amount of the energy of the energy storage unit.

13. A method for managing a sensor network, comprising:
providing a geographically distributed network of sensor nodes, wherein at least one of the sensor nodes comprises a wireless transceiver, a power unit configured to collect energy, and a sensor, and wherein the power unit is configured to collect energy in a capacitor until at least one of a threshold of energy is reached and a predetermined time elapses, and wherein the power unit is configured to discharge the energy from the capacitor after the energy decreases to a minimum energy threshold;
collecting energy at the sensor nodes;
detecting sensor data at the sensor nodes;
communicating the sensor data among at least a portion of the sensor nodes, wherein the sensor nodes are configured to distribute the sensor data to all the sensor nodes in the network via propagation to neighboring nodes in the network; and
receiving the sensor data from at least one of the sensor nodes.

14. The method of claim 13, wherein collecting energy at the sensor nodes comprises collecting energy at the at least one sensor node from a solar cell configured to convert solar radiation into electrical energy and store collected energy in the capacitor.

15. The method of claim 13, wherein providing the geographically distributed network of sensor nodes comprises distributing the sensor nodes such that at least one of the sensor nodes is within communication range of another of the sensor nodes, wherein the at least one sensor node is permanently encapsulated in at least one of glass and epoxy.

16. The method of claim 13, wherein the sensor comprises at least one of an accelerometer, a microphone, a color sensor, a distance sensor, a moisture sensor, and a penetration sensor.

17. The method of claim 13, wherein detecting the sensor data at the sensor nodes comprises storing the sensor data in non-volatile memory, and wherein the non-volatile memory comprises ferroelectric random access memory.

18. The apparatus of claim 1, wherein the power unit is configured to provide a pulse of power in response to the power unit reaching the threshold value, and wherein the processor is configured to operate during the pulse.

19. The apparatus of claim 1, wherein the power unit is configured to discharge the energy at least until the processing unit is caused to reset.

20. The apparatus of claim 1, wherein the sensor unit is configured to activate the sensor from a group of sensors based on an additional energy threshold value associated with the sensor.

* * * * *